(12) United States Patent
Su et al.

(10) Patent No.: US 12,450,922 B2
(45) Date of Patent: Oct. 21, 2025

(54) METHOD FOR DETECTING AN INTERIOR CONDITION OF A VEHICLE, AND SYSTEM IMPLEMENTING THE SAME

(71) Applicant: Automotive Research & Testing Center, Lugong (TW)

(72) Inventors: Yi-Feng Su, Lugong (TW); Zi-Rong Ding, Lugong (TW); Meng-Jiang He, Lugong (TW)

(73) Assignee: AUTOMOTIVE RESEARCH & TESTING CENTER, Lugong (TW)

( * ) Notice: Subject to any disclaimer, the term of this patent is extended or adjusted under 35 U.S.C. 154(b) by 452 days.

(21) Appl. No.: 18/082,126

(22) Filed: Dec. 15, 2022

(65) Prior Publication Data

US 2024/0104943 A1     Mar. 28, 2024

(30) Foreign Application Priority Data

Sep. 28, 2022   (TW) .................................. 111136796

(51) Int. Cl.
*G06V 20/59*       (2022.01)
*G01S 13/89*       (2006.01)
(Continued)

(52) U.S. Cl.
CPC .............. *G06V 20/59* (2022.01); *G01S 13/89* (2013.01); *G06T 5/70* (2024.01); *G06T 5/73* (2024.01);
(Continued)

(58) Field of Classification Search
CPC .... G06V 20/59; G06V 40/171; G06V 20/597; G01S 13/89; G01S 7/412; G01S 7/417;
(Continued)

(56) References Cited

U.S. PATENT DOCUMENTS

2015/0286340 A1* 10/2015 Send ...................... G01S 17/66
                                                                      250/206.1
2019/0349519 A1* 11/2019 Lee ........................... G06T 7/12
(Continued)

FOREIGN PATENT DOCUMENTS

| CN | 110450784 A | 11/2019 |
|----|-------------|---------|
| CN | 112115828 A | 12/2020 |
| CN | 113945913 A | 1/2022  |

OTHER PUBLICATIONS

González-Saavedra et al., "Survey of Cooperative Advanced Driver Assistance Systems: From a Holistic and Systemic Vision", Sensors, vol. 22, No. 3040, 2022, pp. 1-40.

*Primary Examiner* — Michael Robert Cammarata
*Assistant Examiner* — Heath E. Wells
(74) *Attorney, Agent, or Firm* — Birch, Stewart, Kolasch & Birch, LLP (57) ABSTRACT

A method for detecting an interior condition of a vehicle is provided to use a camera device and a radar device to acquire images and point cloud datasets with respect to an interior space of the vehicle. A computing device generates a synthesized image based on the images and the point cloud datasets, obtains a skeleton feature dataset and a facial feature dataset with respect to a living object in the synthesized image, and determines the interior condition of the vehicle based on the skeleton feature dataset and the facial feature dataset.

14 Claims, 6 Drawing Sheets

(51) Int. Cl.
  *G06T 5/70*  (2024.01)
  *G06T 5/73*  (2024.01)
  *G06T 7/70*  (2017.01)
  *G06V 40/16* (2022.01)
  *G08B 21/00* (2006.01)

(52) U.S. Cl.
  CPC .............. *G06T 7/70* (2017.01); *G06V 40/171* (2022.01); *G08B 21/00* (2013.01); *G06T 2207/20044* (2013.01); *G06T 2207/30268* (2013.01)

(58) Field of Classification Search
  CPC ....... G01S 13/886; G01S 13/867; G06T 5/70; G06T 5/73; G06T 7/70; G06T 2207/20044; G06T 2207/30268; G08B 21/00; G08B 21/02; G06F 18/00
  USPC ......................................................... 382/190
  See application file for complete search history.

(56) References Cited

U.S. PATENT DOCUMENTS

| | | | |
|---|---|---|---|
| 2021/0085258 A1 | 3/2021 | Jayachandra et al. | |
| 2021/0146957 A1* | 5/2021 | Kim | B60W 50/14 |
| 2021/0398313 A1 | 12/2021 | Lemley et al. | |
| 2022/0114817 A1* | 4/2022 | Gronau | G06V 40/10 |
| 2022/0230474 A1* | 7/2022 | Hasedzic | G06F 18/24133 |
| 2022/0388524 A1* | 12/2022 | Roberts | B60W 50/12 |
| 2023/0019157 A1* | 1/2023 | Arunmozhi | G06V 40/18 |

\* cited by examiner

METHOD FOR DETECTING AN INTERIOR CONDITION OF A VEHICLE, AND SYSTEM IMPLEMENTING THE SAME

CROSS-REFERENCE TO RELATED APPLICATION

This application claims priority to Taiwanese Invention Patent Application No. 111136796, filed on Sep. 28, 2022.

FIELD

The disclosure relates to a detecting method, and more particularly to a method and a system for detecting an interior condition of a vehicle.

BACKGROUND

In order to ensure driving safety, it is preferable for a driver to be aware of the passengers' behavior in real time, so that the driver can respond in time in case of an emergency. Accordingly, in-vehicle video surveillance has been widely used in recent years. However, a single camera is unable to cover the entire space inside the vehicle regardless of where the camera is installed, and facial features may be undetectable to the camera at certain angles. In addition, the coverage of infrared fill light in the camera may be insufficient for proper detection of the features of passengers in the backseat under a low light condition when the camera is installed in a front portion of the vehicle, which is usually the case. Therefore, multiple cameras (usually more than two for a car because most cars can accommodate five or more people) would be required to attain full detection coverage of the interior space of a vehicle.

However, the use of multiple cameras would result in not only significant cost of equipment but also heavy computational load in terms of processing images obtained by the multiple cameras.

SUMMARY

Therefore, an object of the disclosure is to provide a method that can detect the entire interior space of the vehicle at a relatively low cost and with a relatively light computational load in comparison to using multiple cameras.

According to some embodiments of the disclosure, the method includes steps as follows. In one step, a computing device receives, from a radar device located in an interior space of the vehicle and electrically connected to the computing device, a plurality of candidate point cloud datasets that are acquired within a time period by the radar device with respect to the interior space of the vehicle, and acquires a target point cloud dataset based on the candidate point cloud datasets. In one step, the computing device receives, from a camera device located in the interior space of the vehicle and electrically connected to the computing device, a plurality of candidate images of the interior space of the vehicle that are captured within the time period by the camera device, and acquires a target image from among the candidate images. In one step, the computing device acquires a synthesized image based on the target point cloud dataset and the target image. In one step, the computing device uses a living-object detection model to obtain a living-object position dataset, which is related to a position of a living object in the synthesized image. In one step, the computing device uses a skeleton detection model to obtain a skeleton feature dataset based on the living-object position dataset. The skeleton feature dataset is related to a position of a skeleton of the living object in the synthesized image. In one step, the computing device uses a face detection model to obtain a facial feature dataset based on the synthesized image and the living-object position dataset. The facial feature dataset is related to positions of multiple facial features of the living object in the synthesized image. In one step, the computing device determines the interior condition of the vehicle based on the facial feature dataset and the skeleton feature dataset.

According to some embodiments of the disclosure, the method includes steps as follows. In one step, a computing device receives, from a radar device located in an interior space of the vehicle and electrically connected to the computing device, a plurality of candidate point cloud datasets that are acquired within a time period by the radar device with respect to the interior space of the vehicle, and acquires a target point cloud dataset based on the candidate point cloud datasets. In one step, the computing device receives, from a camera device located in the interior space of the vehicle and electrically connected to the computing device, a plurality of candidate images of the interior space of the vehicle that are captured within the time period by the camera device, and acquires a target image from among the candidate images. In one step, the computing device uses an image-based skeleton detection model to obtain an image-based skeleton feature dataset based on the target image. The image-based skeleton feature dataset is related to a position of a skeleton of a living object in the target image. In one step, the computing device uses an image-based head-posture detection model to obtain, based on the target image, an image-based head-posture dataset that includes a position of an image-based central point of a head of the living object in the target image, and a yaw angle, a pitch angle and a roll angle of the head in relation to the image-based central point. In one step, the computing device uses a point-cloud-based living-object detection model to obtain a point-cloud-based living-object position dataset based on the target point cloud dataset. The point-cloud-based living-object position dataset is related to a position of the living object in a world coordinate system. In one step, the computing device uses a point-cloud-based skeleton detection model to obtain a point-cloud-based skeleton feature dataset based on the target point cloud dataset and the point-cloud-based living-object position dataset. The point-cloud-based skeleton feature dataset includes a position of the skeleton of the living object in the world coordinate system. In one step, by the computing device uses a point-cloud-based head-posture detection model to obtain, based on the target point cloud dataset and the point-cloud-based living-object position dataset, a point-cloud-based head-posture dataset that includes a position of a point-cloud-based central point of the head of the living object in the world coordinate system, and a yaw angle, a pitch angle and a roll angle of the head in relation to the point-cloud-based central point. In one step, the computing device determines the interior condition of the vehicle based on the image-based skeleton feature dataset, the image-based head-posture dataset, the point-cloud-based skeleton feature dataset and the point-cloud-based head-posture dataset.

Another object of the disclosure is to provide a system that can detect the entire interior space of the vehicle at a relatively low cost and with a relatively light computational load in comparison to using multiple cameras.

According to this disclosure, the system includes a camera device, a radar device and a computing device. The camera device is to be located in an interior space of the vehicle, and is configured to continuously capture images with respect to the interior space of the vehicle. The radar device is to be located in the interior space of the vehicle, and is configured to continuously acquire point cloud datasets with respect to the interior space of the vehicle. The computing device is electrically connected to the camera device for receiving a plurality of candidate images captured by the camera device within a time period, is electrically connected to the radar device for receiving a plurality of candidate point cloud datasets acquired by the radar device within the time period, and is configured to determine the interior condition of the vehicle based on the candidate images and the candidate point cloud datasets.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
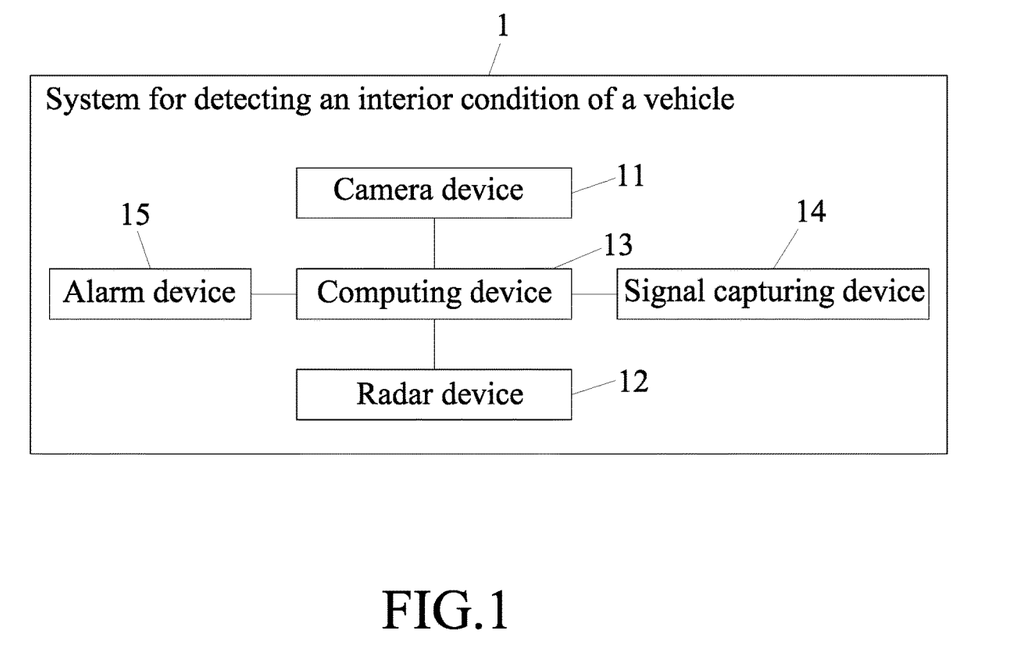
FIG. 1 is a block diagram illustrating an embodiment of a system for detecting an interior condition of a vehicle according to the disclosure.

Referring to FIG. 1, an embodiment of a system 1 for detecting an interior condition of a vehicle according to this disclosure is shown to include a camera device 11, a radar device 12, a computing device 13, a signal capturing device 14 and an alarm device 15. In this embodiment, the above-mentioned devices 11-15 are mounted to and located inside the vehicle, and the computing device 13 is electrically connected to the camera device 11, the radar device 12, the signal capturing device 14 and the alarm device 15.

The camera device 11 is disposed to continuously capture images of an interior space of the vehicle. In this embodiment, the camera device 11 is exemplified as a video camera that captures an image every 33 ms, but this disclosure is not limited in this respect.

The radar device 12 is disposed to continuously acquire point cloud datasets with respect to the interior space of the vehicle, where each of the point cloud datasets includes a plurality of data points. In this embodiment, the radar device 12 is exemplified as an mmWave radar that acquires a point cloud dataset every 50 ms, but this disclosure is not limited in this respect. The radar device 12 used in this embodiment is characterized in that the acquisition of the point cloud datasets with respect to the interior space of the vehicle is not obstructed by the presence of people or most physical objects inside the vehicle, such as clothes, plastic items, and so on.

The computing device 13 may be, for example, a processor, a microcontroller, or other integrated circuit (IC) chips that are capable of computation, etc., but this disclosure is not limited in this respect.

The signal capturing device 14 is disposed to continuously capture vehicle signals that are related to a driving condition of the vehicle. The signal capturing device 14 may be, for example, an on-board diagnostics (OBD) system. The driving condition may include, for example, a vehicle speed, a state of an engine or a motor (e.g., in operation or not), a state of each door (e.g., open or closed), etc., but this disclosure is not limited in this respect.

The alarm device 15 may be, for example, a speaker, a lamp, a screen, etc., but this disclosure is not limited in this respect.

Figure 2:
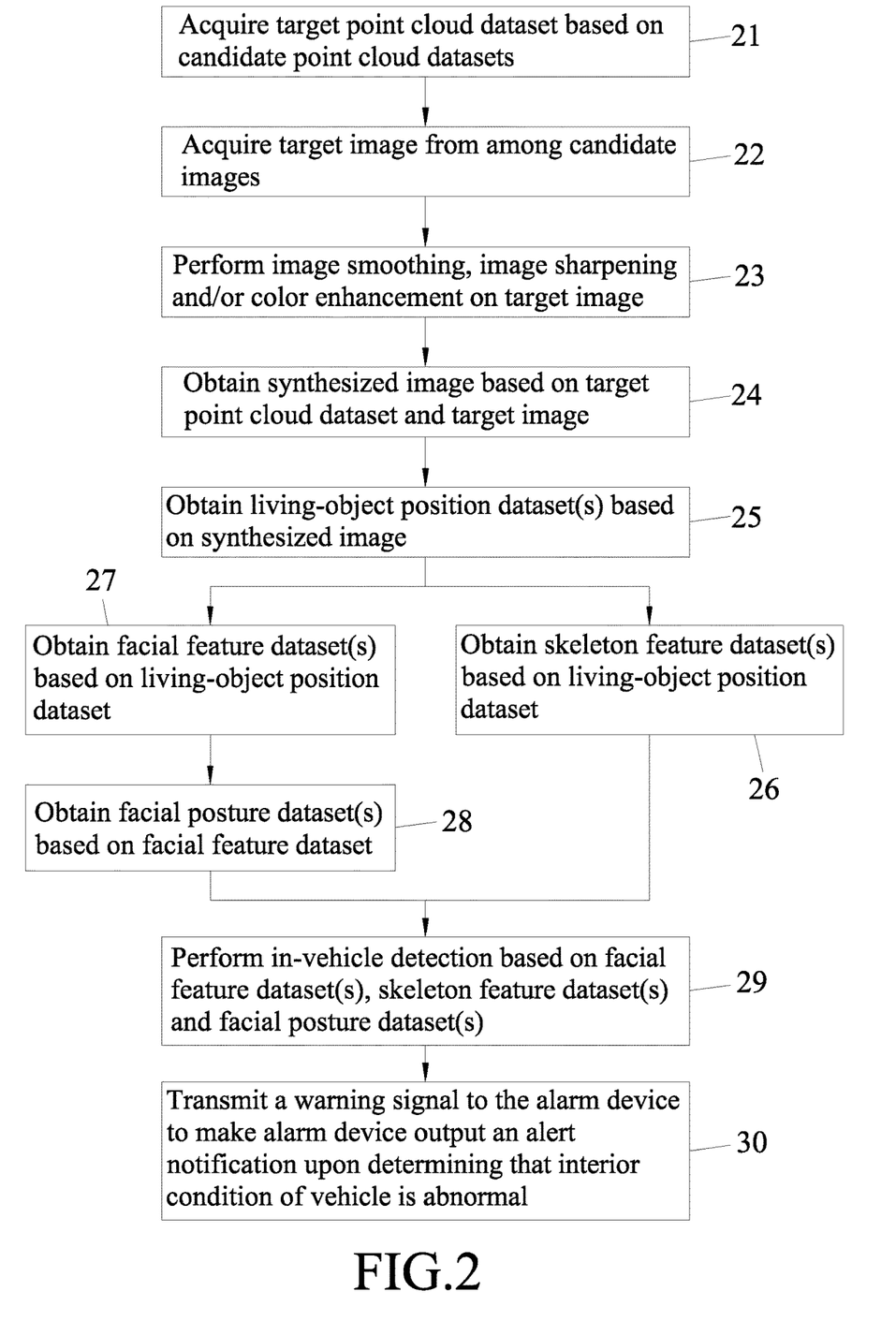
FIG. 2 is a flow chart illustrating steps of a first embodiment of a method for detecting the interior condition of the vehicle according to the disclosure.

Referring to FIGS. 1 and 2, a first embodiment of a method to be implemented by the system 1 is provided for detecting the interior condition of the vehicle.

In step 21, the computing device 13 receives a plurality of candidate point cloud datasets from the radar device 12 within a time period, and performs pre-processing on the candidate point cloud datasets to obtain a target point cloud dataset.

Figure 3:
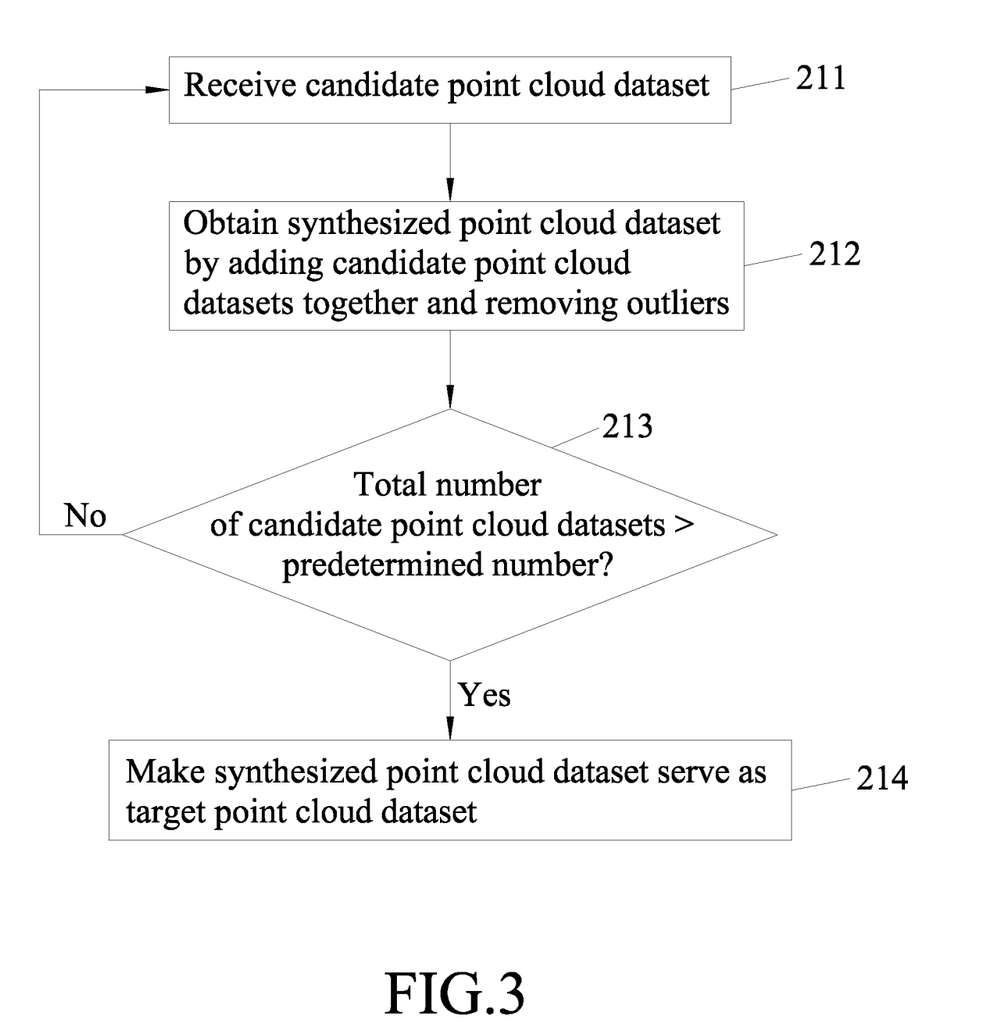
FIG. 3 is a flow chart illustrating sub-steps of step 21 in FIG. 2.

Further referring to FIG. 3, step 21 includes sub-steps 211 to 214.

In sub-step 211, the computing device 13 receives a point cloud dataset from the radar device 12 at a current time point within the time period, and makes the point cloud dataset thus received serve as a candidate point cloud dataset.

In sub-step 212, the computing device 13 adds the candidate point cloud datasets that have been received since a starting point of the time period together to generate a collective point cloud dataset, and removes, from the collective point cloud dataset, outliers defined with respect to a distance from a center of each cluster of data points in the collective point cloud dataset, so as to obtain a synthesized point cloud dataset. In this embodiment, the computing device 13 may use quartiles of the data points in the collective point cloud dataset to determine the outliers. For example, the computing device 13 may determine some data points that fall outside of a range between the first quartile and the third quartile as the outliers, and remove these data points from the collective point cloud dataset to form the synthesized point cloud dataset. However, this disclosure is not limited in this respect.

In sub-step 213, the computing device 13 determines whether a total number of the candidate point cloud datasets that have been received since the starting point of the time period is greater than a predetermined number. When the computing device 13 determines that the total number of the candidate point cloud datasets that have been received since the starting point of the time period is not greater than the predetermined number, the flow returns to sub-step 211 to repeat sub-steps 211 to 213 until the computing device 13 determines that the total number of the candidate point cloud datasets that have been received since the starting point of the time period is greater than the predetermined number, where the time point the latest candidate point cloud dataset was received serves as an end point of the time period. When the computing device 13 determines that the total number of the candidate point cloud datasets that have been received since the starting point of the time period is greater than the predetermined number, the flow goes to sub-step 214.

In sub-step 214, the computing device 13 makes the synthesized point cloud dataset acquired in the last iteration of sub-step 212 serve as the target point cloud dataset.

In step 22, the computing device 13 receives a plurality of candidate images from the camera device 11 within the time period, and acquires a target image from among the candidate images. For example, assuming that the predetermine number in sub-step 213 is three, the time period would have a length of 150 ms in this embodiment, so the computing device 13 would receive four candidate images within the time period. The computing device 13 may select one out of the four candidate images to be the target image. In one embodiment, the target image is randomly selected from among the candidate images. In one embodiment, the latest one of the candidate images is selected to be the target image. However, this disclosure is not limited in this respect.

In step 23, the computing device 13 performs image smoothing, image sharpening, and/or color enhancement on the target image. The image smoothing may remove some noises of the target image, which may result from poor image capturing or quantization process, although the target image may become a little fuzzy. The image sharpening may enhance borders of objects in the target image. The color enhancement may enhance brightness and/or contrast of the target image.

In this embodiment, step 23 is performed in order to enhance features in the target image, and is not necessary in other embodiments.

Figure 4:
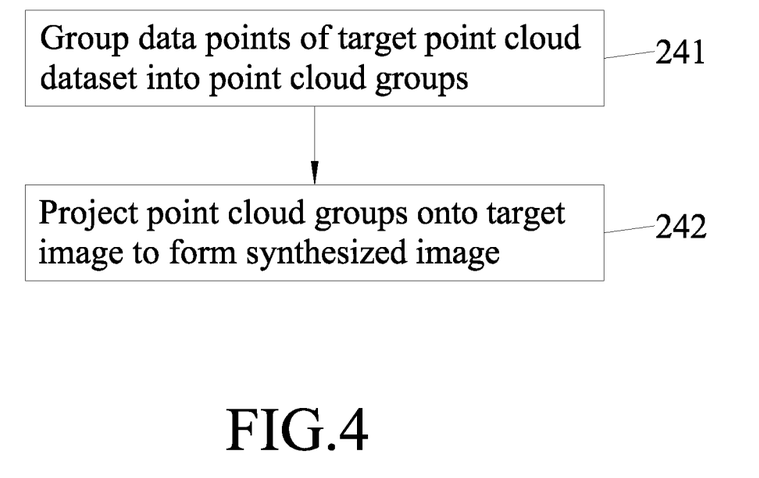
FIG. 4 is a flow chart illustrating sub-steps of step 24 in FIG. 2.

In step 24, the computing device 13 acquires a synthesized image based on the target point cloud dataset and the target image Further referring to FIG. 4, step 24 includes sub-steps 241 and 242.

In sub-step 241, the computing device 13 groups the data points of the target point cloud dataset into multiple point cloud groups, each representing a respective living object (e.g., a person). In this embodiment, the grouping may be performed using the k-means clustering, the Lloyd-max algorithm, etc., but this disclosure is not limited in this respect.

In sub-step 242, the computing device 13 projects the point cloud groups onto the target image to obtain the synthesized image that includes depth information.

In step 25, the computing device 13 uses a living-object detection model to obtain, for each living object in the synthesized image, a living-object position dataset that is related to a position of the living object in the synthesized image. The living-object detection model may be trained using a conventional deep learning algorithm and based on a plurality of living-object position training datasets, so as to detect a position of a living object in an image. Each of the living-object position training datasets includes a training image onto which a training point cloud dataset is projected, and one or more position labels that are related to the position(s) of one or more living objects in the training image.

In step 26, the computing device 13 uses a skeleton detection model to obtain, for each living object in the synthesized image, a skeleton feature dataset based on the living-object position dataset. The skeleton feature dataset is related to a position of a skeleton of the living object in the synthesized image. The skeleton detection model may be trained using a conventional deep learning algorithm and based on a plurality of skeleton training datasets, so as to detect a feature and a position of a skeleton of a living object in an image. Each of the skeleton training datasets corresponds to one of the living-object position training datasets, and includes the training image and the position label(s) of the corresponding living-object position training dataset, and one or more skeleton position labels that respectively correspond to the position label(s) of the corresponding living-object position training dataset.

In step 27, the computing device 13 uses a face detection model to obtain, for each living object in the synthesized image, a facial feature dataset based on the synthesized image and the corresponding living-object position dataset. The facial feature dataset is related to positions of multiple facial features of the living object in the synthesized image. The facial features may include, for example, eyes or pupils of the living object, a nose of the living object, lips of the living object, etc., and this disclosure is not limited in this respect. The face detection model may be trained using a conventional deep learning algorithm and based on a plurality of face training datasets, so as to detect facial features of a living object in an image. Each of the face training datasets corresponds to one of the living-object position training datasets, and includes the training image and the position label(s) of the corresponding living-object position training dataset, and one or more face feature position labels that respectively correspond to the position label(s).

In step 28, the computing device 13 acquires, for each living object in the synthesized image and based on the corresponding facial feature dataset, a facial posture dataset that includes positions of the facial features of the living object in a world coordinate system. In this embodiment, the facial features are exemplified to include the nose and the pupils of the living object, but this disclosure is not limited in this respect.

In this embodiment, the computing device 13 acquires a position of the camera device 11 in the world coordinate system, and then uses the Rodrigues' rotation formula to obtain, based on the position of the camera device 11 in the world coordinate system, a rotation vector related to a three-dimensional space as represented by the world coordinate system. The position of the camera device 11 in the world coordinate system can be obtained based on extrinsic parameters of the camera device 11, and the extrinsic parameters may be obtained by performing calibration on the camera device 11. Eventually, the computing device 13 acquires the facial posture dataset based on the rotation vector, and the positions of the nose and the pupils of the living object in the synthesized image. In some embodiments, the computing device 13 can determine a line of sight of the living object, which is a vector, based on the position of the pupils in the world coordinate system, but this disclosure is not limited to such.

In step 29, the computing device 13 performs in-vehicle detection to determine the interior condition of the vehicle based on the facial feature dataset(s), the skeleton feature dataset(s) and the facial posture dataset(s). The interior condition of the vehicle that is to be detected may include, for example, whether a child is outside of a safety seat, whether a passenger is approaching the driver, whether a passenger has passed out, whether a passenger has fallen off a seat or a wheelchair in the vehicle (in a case where the vehicle is a wheelchair accessible vehicle), whether a passenger has put his/her head or hand(s) out the window(s) of the vehicle, whether a passenger is swinging his/her hand(s) or leg(s) abnormally, whether a passenger is having aggressive behavior, etc. In a case where the interior condition of the vehicle that is to be detected includes whether a passenger is left behind in the vehicle, the computing device 13 may perform in-vehicle detection further based on a target vehicle signal that is acquired by the signal capturing device 14 and that indicates whether the vehicle is under a driving condition. The methods to determine the abovementioned conditions based on the facial feature dataset(s), the skeleton feature dataset(s) and the facial posture dataset(s) should be known to one having ordinary skills in the art, and are not a focus in the present disclosure, so details thereof are omitted herein for the sake of brevity. Because the in-vehicle detection is performed using the facial feature dataset and the skeleton feature dataset, which are obtained by simplifying the living-object position dataset, the computational load for the computing device 13 to determine the interior condition of the vehicle can be significantly reduced.

In step 30, upon determining that the interior condition of the vehicle is abnormal (e.g., one of the abovementioned cases is detected), the computing device 13 transmits a warning signal to the alarm device 15, such that the alarm device 15 outputs an alert notification.

Figure 5:
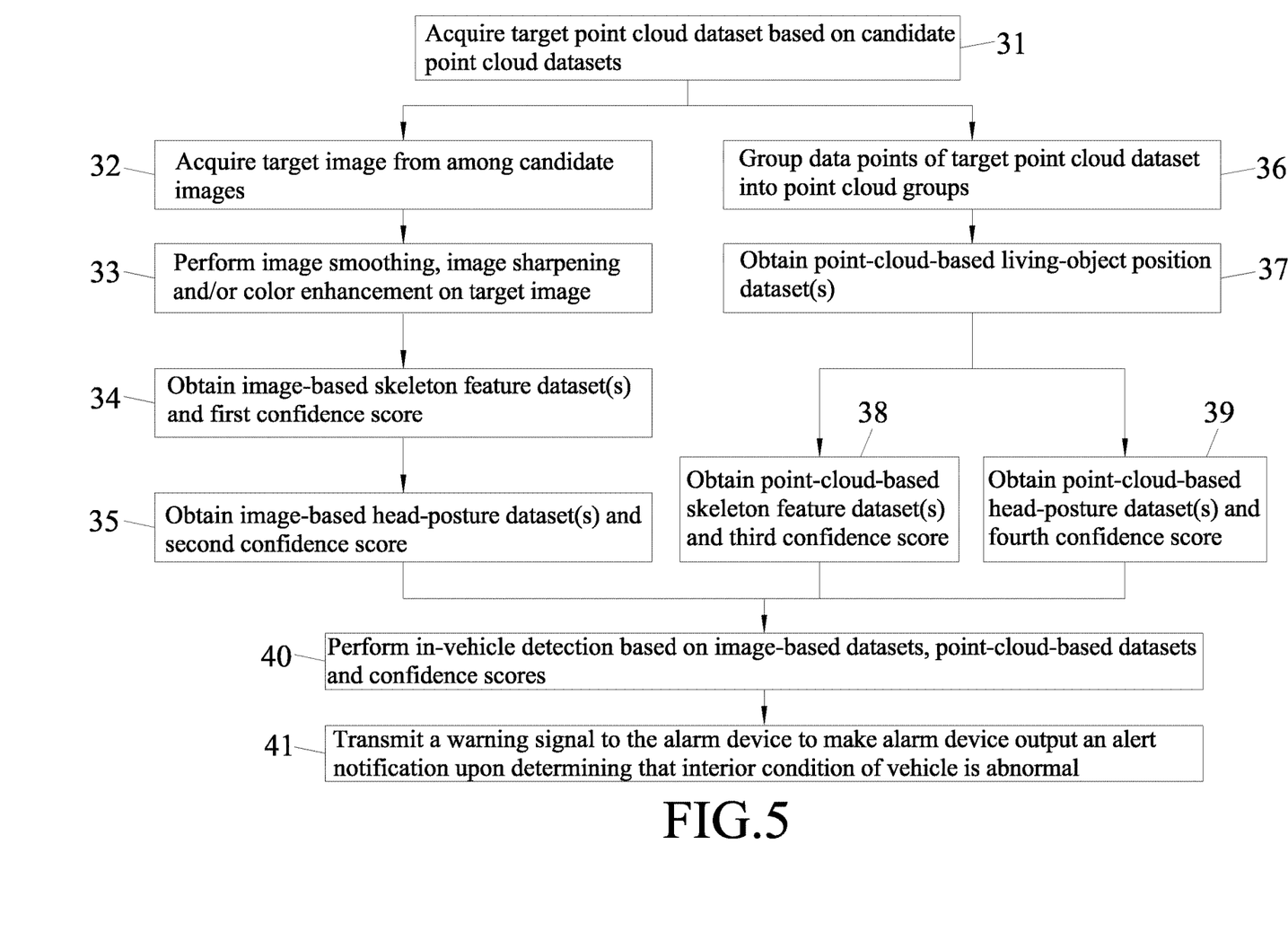
FIG. 5 is a flow chart illustrating steps of a second embodiment of a method for detecting the interior condition of the vehicle according to the disclosure.

Referring to FIGS. 1 and 5, a second embodiment of a method to be implemented by the system 1 is provided for detecting the interior condition of the vehicle.

In step 31, the computing device 13 receives a plurality of candidate point cloud datasets from the radar device 12 within a time period, and performs pre-processing on the candidate point cloud datasets to obtain a target point cloud dataset. Details of step 31 are the same as those of step 21 of the first embodiment (see FIGS. 2 and 3), and thus are omitted herein for the sake of brevity.

In step 32, the computing device 13 receives a plurality of candidate images from the camera device 11 within the time period, and acquires a target image from the candidate images.

In step 33, the computing device 13 performs image smoothing, image sharpening, and/or color enhancement on the target image.

In step 34, for each living object in the target image, the computing device 13 uses an image-based skeleton detection model to obtain, based on the target image, an image-based skeleton feature dataset that corresponds to the living object. The image-based skeleton feature dataset is related to a position of a skeleton of the corresponding living object in the target image. In step 34, the computing device 13 further uses the image-based skeleton detection model to obtain a first confidence score that is related to the image-based skeleton feature dataset(s) obtained for all living object(s) in the target image using the image-based skeleton detection model. The image-based skeleton detection model may be trained using a conventional deep learning algorithm and based on a plurality of image-based skeleton training datasets, so as to detect a feature and a position of a skeleton of a living object in an image. Each of the image-based skeleton training datasets includes a training image, and one or more skeleton position labels that are related to the position(s) of one or more living objects in the training image.

In step 35, for each living object in the target image, the computing device 13 uses an image-based head-posture detection model to obtain, based on the target image and the image-based skeleton feature dataset that corresponds to the living object, an image-based head-posture dataset that corresponds to the living object. The image-based head-posture dataset includes a position of an image-based central point of a head of the corresponding living object in the target image, and a yaw angle, a pitch angle and a roll angle of the head in relation to the image-based central point. In step 35, the computing device 13 further uses the image-based head-posture detection model to obtain a second confidence score that is related to the image-based head-posture dataset(s) obtained for all living object(s) in the target image using the image-based head-posture detection model. The image-based head-posture detection model may be trained using a conventional deep learning algorithm and based on a plurality of image-based head-posture training datasets, so as to detect a head posture of a living object in an image. Each of the image-based head-posture training datasets includes a training image, one or more head position labels that are related to the position(s) of the head(s) of one or more living objects in the training image, and, for the head of each living object, one or more angle labels that are related to the yaw angle, the pitch angle and the roll angle of the head of the living object in the training image.

In some embodiments, the computing device 13 may use the image-based head-posture detection model to obtain the image-based head-posture dataset(s) based on only the target image, and this disclosure is not limited in this respect.

In this embodiment, the pitch angle refers to a rotational angle about an X-axis of the world coordinate system, and corresponds to a motion of lifting or bowing the head; the yaw angle refers to a rotational angle about a Y-axis of the world coordinate system, and corresponds to a motion of tilting the head sideways; and the roll angle refers to a rotational angle about a Z-axis of the world coordinate system, and corresponds to a motion of turning the head. A method to acquire the image-based head-posture dataset may be referenced to, for example, "BAZAREVSKY, Valentin, et al. *Blazeface: Sub-millisecond neural face detection on mobile GPUs*. arXiv preprint arXiv:1907.05047, 2019," and details thereof are omitted herein for the sake of brevity.

In step 36, the computing device 13 groups the data points of the target point cloud dataset into multiple point cloud groups, each representing a respective living object in the target point cloud dataset.

In step 37, the computing device 13 uses a point-cloud-based living-object detection model to obtain, for each living object (or point cloud group) in the target point cloud dataset, a point-cloud-based living-object position dataset based on the target point cloud dataset and the corresponding point cloud group. The point-cloud-based living-object position dataset is related to a position of the living object in the world coordinate system. The point-cloud-based living-object detection model may be trained using a conventional deep learning algorithm and based on a plurality of point-cloud-based living-object position training datasets, so as to detect a position of a living object in a point cloud dataset. Each of the point-cloud-based living-object position training datasets includes a training point cloud dataset, and one or more position labels that are related to the position(s) of one or more living objects in the training point cloud dataset.

In step 38, for each living object (or point cloud group) in the target point cloud dataset, the computing device 13 uses a point-cloud-based skeleton detection model to obtain, based on the target point cloud dataset and the point-cloud-based living-object position dataset, a point-cloud-based skeleton feature dataset that corresponds to the living object. The point-cloud-based skeleton feature dataset includes a position of the skeleton of the corresponding living object in the world coordinate system. In step 38, the computing device 13 further uses the point-cloud-based skeleton detection model to obtain a third confidence score that is related to the point-cloud-based skeleton feature dataset(s) obtained for all living object(s) in the target point cloud dataset using the point-cloud-based skeleton detection model. The point-cloud-based skeleton detection model may be trained using a conventional deep learning algorithm and based on a plurality of point-cloud-based skeleton training datasets, so as to detect a feature and a position of a skeleton of a living object in a point cloud dataset. Each of the point-cloud-based skeleton training datasets includes a training point cloud dataset, and one or more skeleton position labels that are related to the position(s) of the skeleton(s) of one or more living objects in the training point cloud dataset.

In step 39, for each living object in the target point cloud dataset, the computing device 13 uses a point-cloud-based head-posture detection model to obtain, based on the target point cloud dataset and the point-cloud-based living-object position dataset, a point-cloud-based head-posture dataset that corresponds to the living object. The point-cloud-based head-posture dataset includes a position of a point-cloud-based central point of the head of the corresponding living object in the world coordinate system, and a yaw angle, a pitch angle and a roll angle of the head in relation to the point-cloud-based central point. In step 39, the computing device 13 further uses the point-cloud-based head-posture detection model to obtain a fourth confidence score that is related to the point-cloud-based head-posture dataset(s) obtained for all living object(s) in the target point cloud dataset using the point-cloud-based head-posture detection model. The point-cloud-based head-posture detection model may be trained using a conventional deep learning algorithm and based on a plurality of point-cloud-based head-posture training datasets, so as to detect a head posture of a living object in a point cloud dataset. Each of the point-cloud-based head-posture training datasets includes a training point cloud dataset, one or more head position labels that are related to the position(s) of the head(s) of one or more living objects in the training point cloud dataset, and, for each living object, one or more angle labels that are related to the yaw angle, the pitch angle and the roll angle of the head of the living object in the training point cloud dataset.

In step 40, the computing device 13 performs in-vehicle detection to determine the interior condition of the vehicle based on the image-based skeleton feature dataset(s), the image-based head-posture dataset(s), the point-cloud-based skeleton feature dataset(s), the point-cloud-based head-posture dataset(s), the first confidence score, the second confidence score, the third confidence score and the fourth confidence score.

Similar to the first embodiment, the interior condition of the vehicle that is to be detected in this embodiment may include, for example, whether a child is outside of a safety seat, whether a passenger is approaching the driver, whether a passenger has passed out, whether a passenger has fallen off a seat or a wheelchair in the vehicle (in a case where the vehicle is a wheelchair accessible vehicle), whether a passenger has put his/her head or hand(s) out the window(s) of the vehicle, whether a passenger is swinging his/her arm(s) or leg(s) abnormally, whether a passenger is having aggressive behavior, etc. In a case where the interior condition of the vehicle that is to be detected includes whether a passenger is left behind in the vehicle, the computing device 13 may perform in-vehicle detection further based on a target vehicle signal that is acquired by the signal capturing device 14 and that indicates whether the vehicle is under a driving condition.

Figure 6:
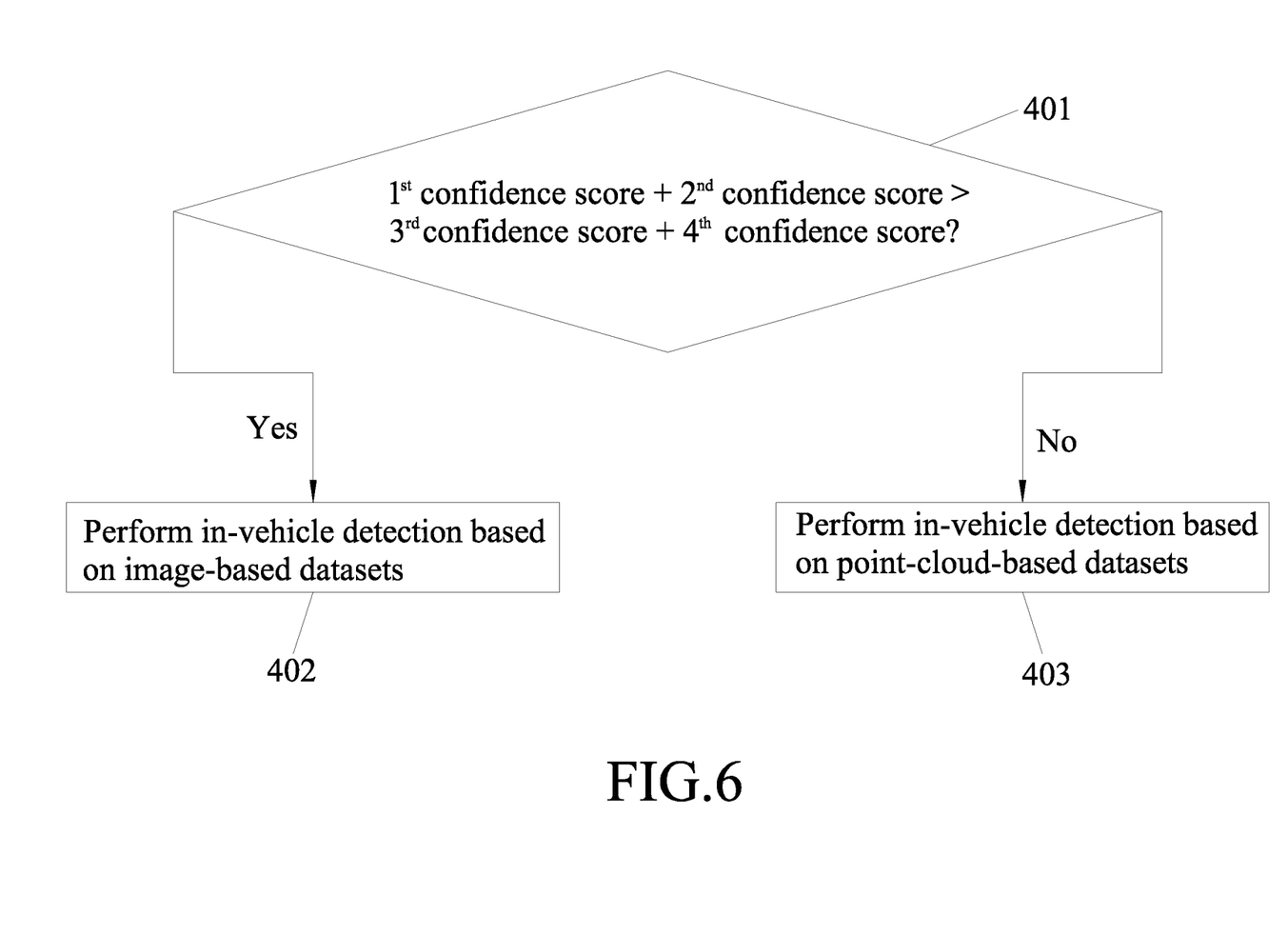
FIG. 6 is a flow chart illustrating sub-steps of step 40 in FIG. 5.

Further referring to FIG. 6, step 40 includes sub-steps 401 to 403.

In sub-step 401, the computing device 13 compares a sum of the first confidence score and the second confidence score with a sum of the third confidence score and the fourth confidence score. When the computing device 13 determines that the sum of the first confidence score and the second confidence score is greater than the sum of the third confidence score and the fourth confidence score, the flow goes to sub-step 402. When the computing device 13 determines that the sum of the first confidence score and the second confidence score is smaller than the sum of the third confidence score and the fourth confidence score, the flow goes to sub-step 403.

In sub-step 402, the computing device 13 performs in-vehicle detection to determine the interior condition of the vehicle based on the image-based skeleton feature dataset(s) and the image-based head-posture dataset(s).

In sub-step 403, the computing device performs in-vehicle detection to determine the interior condition of the vehicle based on the point-cloud-based skeleton feature dataset(s) and the point-cloud-based head-posture dataset(s).

In this embodiment, in a case where the computing device 13 determines that the sum of the first confidence score and the second confidence score is equal to the sum of the third confidence score and the fourth confidence score, the flow goes to sub-step 403. In some embodiments, when the computing device 13 determines that the sum of the first confidence score and the second confidence score is equal to the sum of the third confidence score and the fourth confidence score, the flow may go to sub-step 402. However, this disclosure is not limited in this respect.

In this embodiment, the computing device 13 determines, based on the first to fourth confidence scores, to use the image-based datasets (i.e., the image-based skeleton feature dataset(s) and the image-based head-posture dataset(s)) or the point-cloud-based datasets (i.e., the point-cloud-based skeleton feature dataset(s) and the point-cloud-based head-posture dataset(s)) to perform the in-vehicle detection. In some embodiments, for each living object in the target image and in the target point cloud dataset, the computing device 13 may integrate the image-based skeleton feature dataset and the point-cloud-based skeleton feature dataset together to form a combined skeleton feature dataset, and integrate the image-based head-posture dataset and the point-cloud-based head-posture dataset to form a combined head-posture dataset. In practice, the computing device 13 may transform spatial coordinates of the data points of the point cloud datasets into the world coordinate system, and superimpose the transformed data points of the point cloud datasets onto the target image that has been transformed into the world coordinate system, so as to generate an integrated dataset, which may include, for example, a two-dimensional (2D) matrix of red-color information, a 2D matrix of green-color information, a 2D matrix of blue-color information and a 2D matrix of depth information, and which can be used to obtain the combined skeleton feature dataset and the combined head-posture dataset. Then, the computing device 13 performs in-vehicle detection based on the combined skeleton feature dataset and the combined head-posture dataset in step 40. In some embodiments, the computing device 13 does not obtain the first to fourth confidence scores in steps 34, 35, 38 and 39, and performs in-vehicle detection based on the image-based skeleton feature dataset, the image-based head-posture dataset, the point-cloud-based skeleton feature dataset and the point-cloud-based head-posture dataset.

In step 41, upon determining that the interior condition of the vehicle is abnormal, the computing device 13 transmits a warning signal to the alarm device 15, such that the alarm device 15 outputs an alert notification.

To sum up, in the first embodiment, the computing device 13 performs pre-processing to integrate the target point cloud dataset and the target image together, so as to generate a synthesized image. The target point cloud dataset makes the synthesized image have the characteristics of the radar device 12 (e.g., detection thereof will not be obstructed by the presence of people or most physical objects), so that the living-object detection model, the skeleton detection model and the face detection model can have a better success rate in recognizing the living-object, the skeleton or the facial features. Since the radar device 12 can achieve a full detection coverage of the interior space of the vehicle, which traditionally needs a large number of camera devices, lower material cost and less computational load can be achieved. In the second embodiment, the computing device 13 determines, based on the first to fourth confidence scores, to use the image-based dataset or the point-cloud-based dataset to perform in-vehicle detection, so as to achieve a relatively better success rate in recognizing the skeleton and the head posture. Further, in some implementations of the second embodiment, the computing device 13 may perform post-processing to generate the combined skeleton feature dataset and the combined head-posture dataset. The characteristics of the radar device 12 makes the second embodiment achieve a full detection coverage of the interior space of the vehicle, so additional camera devices are not needed, thereby reducing material cost and computational load.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for detecting an interior condition of a vehicle, comprising steps of:
    A) by a computing device, receiving, from a radar device located in an interior space of the vehicle and electrically connected to the computing device, a plurality of candidate point cloud datasets that are acquired within a time period by the radar device with respect to the interior space of the vehicle, and acquiring a target point cloud dataset based on the candidate point cloud datasets;
    B) by the computing device, receiving, from a camera device located in the interior space of the vehicle and electrically connected to the computing device, a plurality of candidate images of the interior space of the vehicle that are captured within the time period by the camera device, and acquiring a target image from among the candidate images;
    C) by the computing device, acquiring a synthesized image based on the target point cloud dataset and the target image;
    D) by the computing device, using a living-object detection model to obtain a living-object position dataset, which is related to a position of a living object in the synthesized image;
    E) by the computing device, using a skeleton detection model to obtain a skeleton feature dataset based on the living-object position dataset, wherein the skeleton feature dataset is related to a position of a skeleton of the living object in the synthesized image;
    F) by the computing device, using a face detection model to obtain a facial feature dataset based on the synthesized image and the living-object position dataset, wherein the facial feature dataset is related to positions of multiple facial features of the living object in the synthesized image; and
    G) by the computing device, determining the interior condition of the vehicle based on the facial feature dataset and the skeleton feature dataset,
    wherein step A) includes sub-steps of:
    A-1) receiving a point cloud dataset from the radar device at a current time point within the time period, and making the point cloud dataset thus received serve as one of the candidate point cloud datasets;
    A-2) adding some of the candidate point cloud datasets that have been received since a starting point of the time period together, and removing outliers from said some of the candidate point cloud datasets that have been added together, so as to obtain a synthesized point cloud dataset;
    A-3) determining whether a total number of said some of the candidate point cloud datasets is greater than a predetermined number;
    A-4) upon determining that the total number of said some of the candidate point cloud datasets is not greater than the predetermined number, repeating sub-steps A-1) to A-3); and
    A-5) upon determining that the total number of said some of the candidate point cloud datasets is greater than the predetermined number, making the synthesized point cloud dataset serve as the target point cloud dataset.

2. The method as claimed in claim 1, wherein the facial features of the living object include a nose and pupils of the living object, said method further comprising a step of:
    H) by the computing device, acquiring, based on the facial feature dataset, a facial posture dataset that includes positions of the nose and the pupils of the living object in a world coordinate system; and
    wherein, in step G), the interior condition of the vehicle is determined further based on the facial posture dataset.

3. The method as claimed in claim 1, wherein the target point cloud dataset includes a plurality of data points, and step C) includes sub-steps of:

C-1) grouping the data points of the target point cloud dataset into multiple point cloud groups; and C-2) projecting the point cloud groups onto the target image to obtain the synthesized image.

4. The method as claimed in claim 1, further comprising, between steps B) and C), a step of:

H) by the computing device, performing at least one of image smoothing, image sharpening, and color enhancement on the target image.

5. The method as claimed in claim 1, wherein, in step G), the interior condition of the vehicle is determined further based on a target vehicle signal that is acquired by a signal capturing device capturing a driving condition information of the vehicle at a current time point, and the signal capturing device is disposed in the interior space of the vehicle, and is electrically connected to the computing device.

6. The method as claimed in claim 1, further comprising, after step G), a step of:

H) by the computing device, upon determining that the interior condition of the vehicle is abnormal, transmitting a warning signal to an alarm device that is disposed in the interior space of the vehicle and that is electrically connected to the computing device, such that the alarm device outputs an alert notification.

7. A method for detecting an interior condition of a vehicle, comprising steps of:

A) by a computing device, receiving, from a radar device located in an interior space of the vehicle and electrically connected to the computing device, a plurality of candidate point cloud datasets that are acquired within a time period by the radar device with respect to the interior space of the vehicle, and acquiring a target point cloud dataset based on the candidate point cloud datasets;

B) by the computing device, receiving, from a camera device located in the interior space of the vehicle and electrically connected to the computing device, a plurality of candidate images of the interior space of the vehicle that are captured within the time period by the camera device, and acquiring a target image from among the candidate images;

C) by the computing device, using an image-based skeleton detection model to obtain an image-based skeleton feature dataset based on the target image, wherein the image-based skeleton feature dataset is related to a position of a skeleton of a living object in the target image;

D) by the computing device, using an image-based head-posture detection model to obtain, based on the target image, an image-based head-posture dataset that includes a position of an image-based central point of a head of the living object in the target image, and a yaw angle, a pitch angle and a roll angle of the head in relation to the image-based central point;

E) by the computing device, using a point-cloud-based living-object detection model to obtain a point-cloud-based living-object position dataset based on the target point cloud dataset, wherein the point-cloud-based living-object position dataset is related to a position of the living object in a world coordinate system;

F) by the computing device, using a point-cloud-based skeleton detection model to obtain a point-cloud-based skeleton feature dataset based on the target point cloud dataset and the point-cloud-based living-object position dataset, wherein the point-cloud-based skeleton feature dataset includes a position of the skeleton of the living object in the world coordinate system;

G) by the computing device, using a point-cloud-based head-posture detection model to obtain, based on the target point cloud dataset and the point-cloud-based living-object position dataset, a point-cloud-based head-posture dataset that includes a position of a point-cloud-based central point of the head of the living object in the world coordinate system, and a yaw angle, a pitch angle and a roll angle of the head in relation to the point-cloud-based central point; and H) by the computing device, determining the interior condition of the vehicle based on the image-based skeleton feature dataset, the image-based head-posture dataset, the point-cloud-based skeleton feature dataset and the point-cloud-based head-posture dataset, wherein step A) includes sub-steps of:

A-1) receiving a point cloud dataset from the radar device at a current time point within the time period, and making the point cloud dataset thus received serve as one of the candidate point cloud datasets;

A-2) adding some of the candidate point cloud datasets that have been received since a starting point of the time period together, and removing outliers from said some of the candidate point cloud datasets that have been added together, so as to obtain a synthesized point cloud dataset;

A-3) determining whether a total number of said some of the candidate point cloud datasets is greater than a predetermined number;

A-4) upon determining that the total number of said some of the candidate point cloud datasets is not greater than the predetermined number, repeating sub-steps A-1) to A-3); and A-5) upon determining that the total number of said some of the candidate point cloud datasets is greater than the predetermined number, making the synthesized point cloud dataset serve as the target point cloud dataset.

8. The method as claimed in claim 7, further comprising, between steps B) and C), a step of:

I) by the computing device, performing at least one of image smoothing, image sharpening, and color enhancement on the target image.

9. The method as claimed in claim 7, wherein the target point cloud dataset include a plurality of data points, said method further comprising, before step E), a step of:

I) grouping the data points of the target point cloud dataset into multiple point cloud groups; and wherein, in step E), the point-cloud-based living-object position dataset is obtained based on the point cloud groups.

10. The method as claimed in claim 7, wherein step C) includes obtaining a first confidence score that is related to the image-based skeleton feature dataset obtained using the image-based skeleton detection model;

wherein step D) includes obtaining a second confidence score that is related to the image-based head-posture dataset obtained using the image-based head-posture detection model;

wherein step F) includes obtaining a third confidence score that is related to the point-cloud-based skeleton feature dataset obtained using the point-cloud-based skeleton detection model;

wherein step G) includes obtaining a fourth confidence score that is related to the point-cloud-based head-posture dataset obtained using the point-cloud-based head-posture detection model;

wherein, in step H), the interior condition of the vehicle is determined further based on the first confidence score, the second confidence score, the third confidence score and the fourth confidence score, and step H) includes sub-steps of:

H-1) determining whether a sum of the first confidence score and the second confidence score is greater than a sum of the third confidence score and the fourth confidence score;

H-2) upon determining that the sum of the first confidence score and the second confidence score is greater than the sum of the third confidence score and the fourth confidence score, determining the interior condition of the vehicle based on the image-based skeleton feature dataset and the image-based head-posture dataset; and H-3) upon determining that the sum of the first confidence score and the second confidence score is smaller than the sum of the third confidence score and the fourth confidence score, determining the interior condition of the vehicle based on the point-cloud-based skeleton feature dataset and the point-cloud-based head-posture dataset.

11. The method as claimed in claim 7, wherein, in step H), the interior condition of the vehicle is determined further based on a target vehicle signal that is acquired by a signal capturing device capturing a driving condition information of the vehicle at a current time point, and the signal capturing device is disposed in the interior space of the vehicle, and is electrically connected to the computing device.

12. The method as claimed in claim 7, further comprising, after step H), a step of:

I) by the computing device, upon determining that the interior condition of the vehicle is abnormal, transmitting a warning signal to an alarm device that is disposed in the interior space of the vehicle and that is electrically connected to the computing device, such that the alarm device outputs an alert notification.

13. A system for detecting an interior condition of a vehicle, comprising:

a camera device that is to be located in an interior space of the vehicle, and that is configured to continuously capture images with respect to the interior space of the vehicle;

a radar device that is to be located in the interior space of the vehicle, and that is configured to continuously acquire point cloud datasets with respect to the interior space of the vehicle; and a computing device that is electrically connected to said camera device for receiving a plurality of candidate images captured by said camera device within a time period, that is electrically connected to said radar device for receiving a plurality of candidate point cloud datasets acquired by said radar device within the time period, and that is configured to determine the interior condition of the vehicle based on the candidate images and the candidate point cloud datasets, wherein said computing device is configured to perform the method as claimed in claim 1.

14. A system for detecting an interior condition of a vehicle, comprising:

a camera device that is to be located in an interior space of the vehicle, and that is configured to continuously capture images with respect to the interior space of the vehicle;

a radar device that is to be located in the interior space of the vehicle, and that is configured to continuously acquire point cloud datasets with respect to the interior space of the vehicle; and a computing device that is electrically connected to said camera device for receiving a plurality of candidate images captured by said camera device within a time period, that is electrically connected to said radar device for receiving a plurality of candidate point cloud datasets acquired by said radar device within the time period, and that is configured to determine the interior condition of the vehicle based on the candidate images and the candidate point cloud datasets, wherein said computing device is configured to perform the method as claimed in claim 7.

* * * * *